United States Patent [19]

French

[11] Patent Number: 4,462,566
[45] Date of Patent: Jul. 31, 1984

[54] PRESSURE COMPENSATED FLOW CONTROL SYSTEM

[76] Inventor: Bruce C. French, R.R. #2, Caledon East, Ontario, Canada, L0N 1E0.

[21] Appl. No.: 347,065
[22] Filed: Feb. 8, 1982
[51] Int. Cl.³ .............................................. F16K 31/12
[52] U.S. Cl. ....................................... 251/30; 91/446; 137/501; 251/33; 251/63; 251/63.5
[58] Field of Search .................... 137/501; 251/30, 33, 251/63, 63.5; 91/446

[56] References Cited

U.S. PATENT DOCUMENTS 3,596,677  8/1971  Clark et al. ........................ 137/501
4,121,610 10/1978  Harms et al. ........................ 251/30

Primary Examiner—Ronald C. Capossela
Attorney, Agent, or Firm—Ridout & Maybee

[57] ABSTRACT

In a pressure compensated flow control system a flow control valve has a valve element which is subjected to pulsating fluid pressure by which it is maintained in a state of dither about a mean position corresponding to the selected flow rate through the valve. The valve element is spring-biassed towards a closed position and is displaced against the spring bias by an amount which is a function of the rate at which fluid is applied on one side of the valve element and the rate at which the fluid is bled away via an orifice.

17 Claims, 5 Drawing Figures

PRESSURE COMPENSATED FLOW CONTROL SYSTEM

FIELD OF THE INVENTION

This invention relates to flow control in hydraulic systems, and is particularly concerned with flow control valves for use in such systems and with means for regulating such valves for regulating or controlling the rate of fluid flow.

BACKGROUND OF THE INVENTION

In order to regulate the flow of fluid in a hydraulic system it is known to provide a flow regulating valve having inlet and outlet ports connected in the line and having a slidable valve element cooperating with the ports to define a variable flow passage therebetween, the rate of fluid flow depending upon the position of the valve element with respect to the ports. The valve element is normally biassed in a direction tending to close the variable flow passage and is displaceable against its bias to open the flow passage by a selected amount. For controlling the displacement of the valve element a pilot valve may be employed for supplying a control fluid to a pilot chamber on one side of the valve element, the positioning of the element being determined by the pilot chamber pressure and the force exerted by the biasing means.

SUMMARY OF THE INVENTION

In contrast, in a flow control valve according to the present invention, the displacement of the valve element is determined by the volumetric rate at which the control fluid is supplied to the pilot chamber, the control fluid being bled therefrom at a rate which is a function of the displacment.

Thus, according to one aspect of the present invention, a flow control valve for hydraulic fluids comprises: a valve housing providing an inlet port for connection to a pressurized fluid supply and an outlet port for connection to a fluid line; a valve member slidably positioned in said housing, the valve member cooperating with said inlet and outlet ports to define a variable flow passage therebetween; means resiliently biasing the valve member towards a first position at which it closes said variable flow passage, the valve housing further providing pilot chamber having a connecting port for connection to a control fluid supply, the valve member having one face exposed to fluid pressure in said pilot chamber and being displaceable thereby against the bias of said biasing means for opening said variable flow passage; and bleed means communicating with said pilot chamber for bleeding fluid therefrom whereby, in operation of the valve, the valve member is maintained at a mean position determined by the mean fluid pressure in said pilot chamber.

To overcome the problem of static friction in the movement of the valve member the valve may be combined with a pulsating fluid supply means for supplying control fluid to the pilot chamber via the connecting port, said supply means comprising a solenoid-operated poppet valve having an inlet port for connection to the pressurized fluid supply and an outlet port connected to said connecting port of the pilot chamber.

BRIEF DESCRIPTION OF THE DRAWINGS

In order that the invention may be readily understood one embodiment thereof will now be described, by way of example, with reference to the accompanying drawings, in which.

DESCRIPTION OF THE PREFERRED EMBODIMENTS

Figure 1:
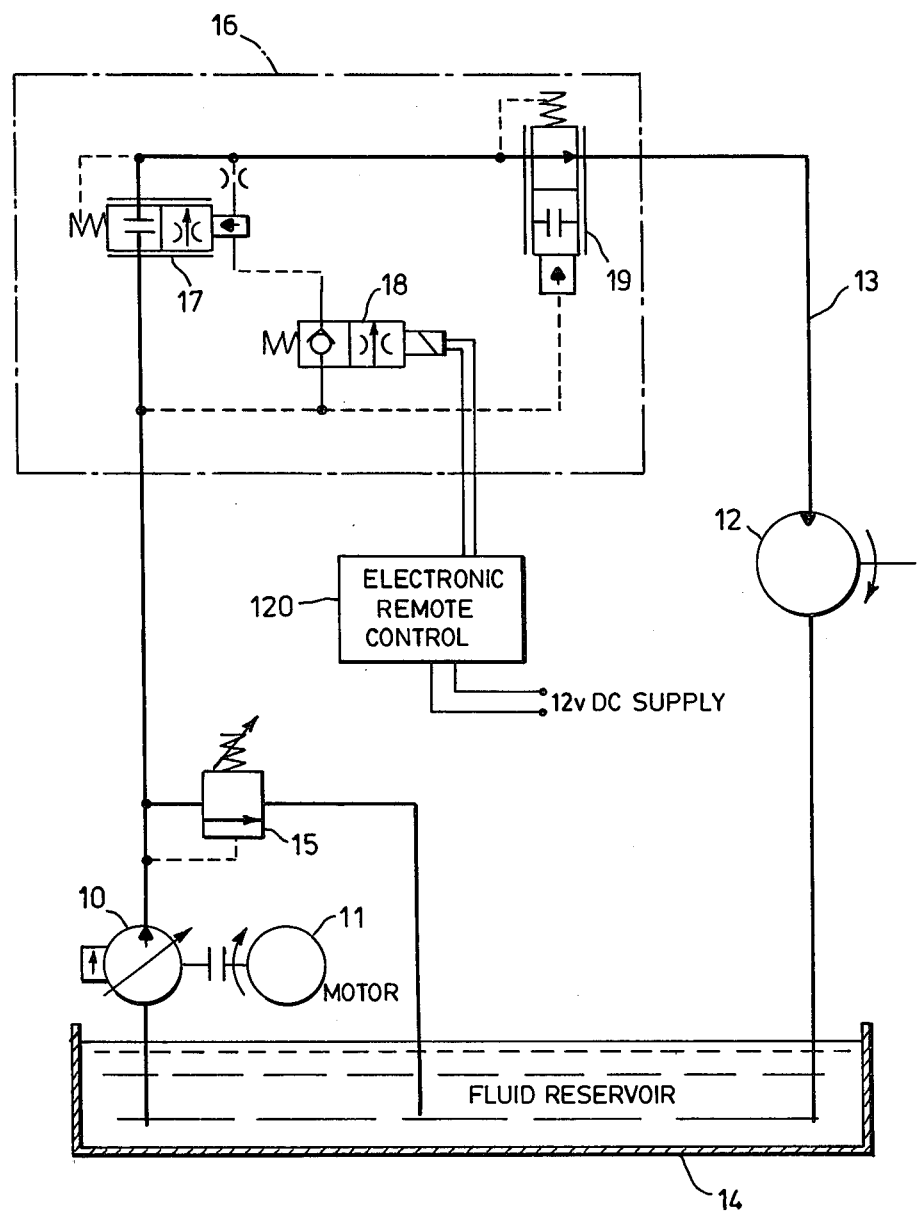
FIG. 1 is a simplified schematic diagram of a hydraulic circuit incorporating a continuously variable, pressure compensated flow control system in accordance with the invention.

The hydraulic circuit shown in FIG. 1 is a very basic circuit comprising a variable displacement, constant pressure hydraulic pump 10, driven by an electric motor 11, and supplying a load represented in the present example by a hydraulic motor 12, the circuit being completed by a fluid line 13 and a fluid reservoir 14. The maximum fluid pressure in the system is limited by a pressure relief valve 15 of any suitable known type connected at the outlet of the pump 10.

Connected in the fluid line 13 is a pressure compensated flow control assembly 16. This assembly, which will be described in greater detail with reference to FIG. 2, comprises essentially a flow control valve 17, a solenoid valve 18 for controlling the flow control valve, and a pressure compensator 19 connected in the line 13 on the downstream side of the flow control valve. As hereinafter described, the setting of the flow control valve 17 for regulating the fluid flow is controlled by a supply of control fluid, which in the present example is a pulsating supply of fluid from the solenoid valve 18, the control pressure being determined by the actuation of the solenoid valve. The solenoid valve 18 is in fact a solenoid-operated poppet valve the solenoid of which is operatively connected to a remote electronic control unit 120 energized, for example, from a convenient 12 volt D.C. supply. The unit 120 may be adapted to provide energizing pulses of predetermined duration for energizing the valve solenoid, in which case the output of the solenoid valve 18 and hence the control pressure of the flow control valve 17 may be varied over a continuous range by varying the pulse frequency. Alternatively the energizing pulses may be of predetermined frequency in which case the output of the solenoid valve and hence the control pressure of the valve 17 may be varied over a continuous range by varying the pulse duration or width of the energizing pulses. Of course, for special application requirements, both the frequency and the duration of the energizing pulses may be varied thoughout predetermined ranges. For typical applications the pulse frequency may be varied, for example, from 5 to 25 pulses per second, a typical pulse width being 20 milliseconds.

Figure 2:
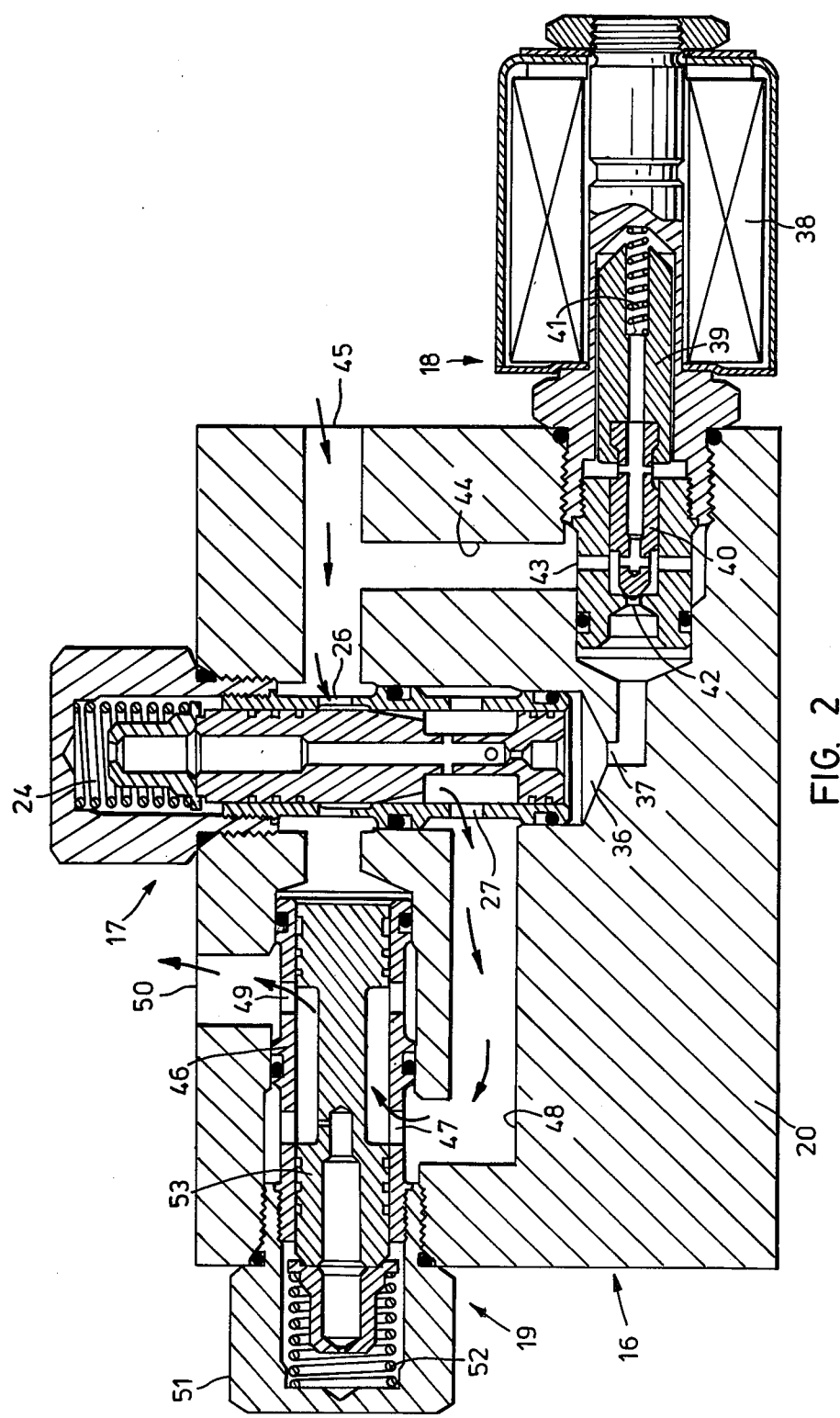
FIG. 2 is a sectional view of a valve assembly used to control the flow rate in the circuit of FIG. 1.

The flow control assembly 16 is illustrated in greater detail in FIG. 2. This comprises the flow control valve 17, the solenoid valve 18, the pressure compensating valve 19, and a valve block 20 which provides respective cylindrical bores in which these valves are mounted and internal passages or ducts providing appropriate interconnections between the valves.

Figure 3:
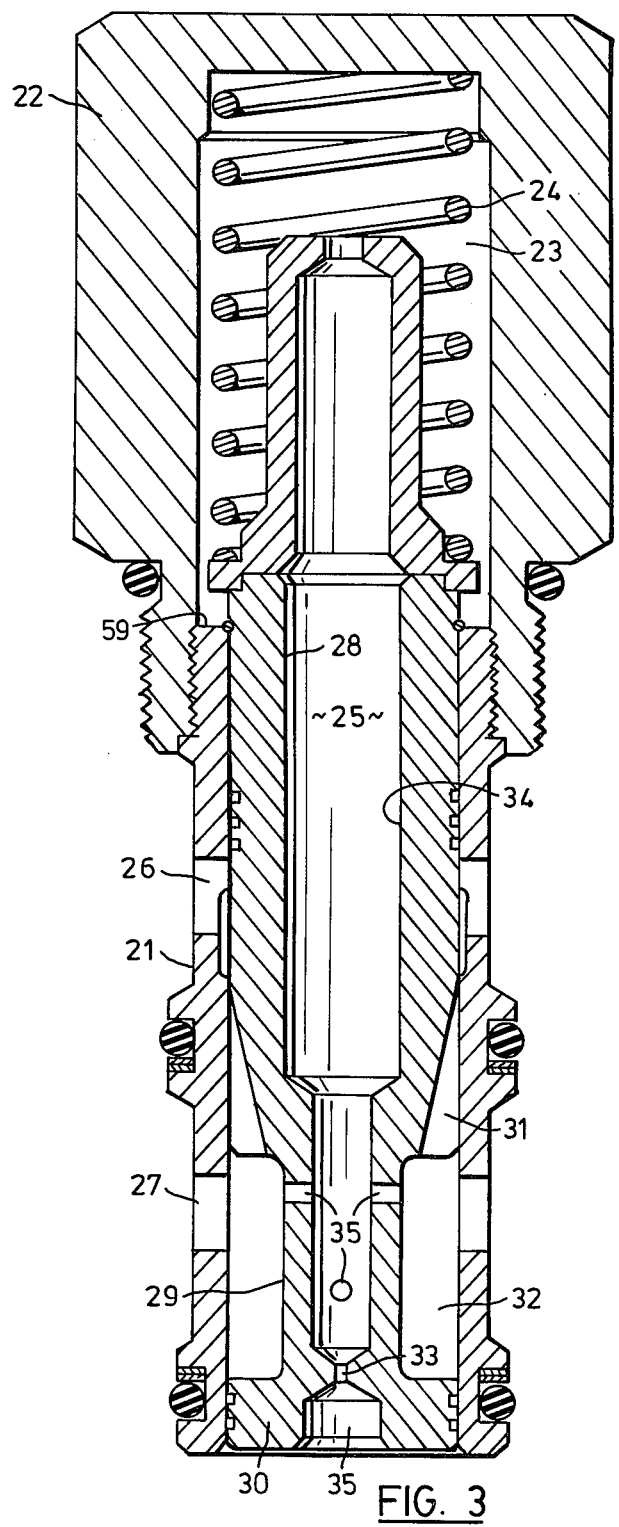
FIG. 3 is an enlarged sectional view of the flow control valve.

The structure of the flow control valve 17 is best illustrated in FIG. 3. This comprises a cylindrical valve housing 21 closed at one end by a retainer cap 22 which is threaded to the housing 21 forming an end chamber 23 which houses a compression spring 24. The valve housing 21 is formed with a cylindrical bore in which a valve member, or spool member 25, is freely slidable. The spool member is resiliently biassed in the direction away from the chamber 23 by the compression spring 24, its limiting position being determined by a shoulder 59 (FIG. 3). The housing 21 provides a ring of inlet ports 26 and a ring of outlet ports 27.

The valve member or spool member 25 is formed with a generally cylindrical throttle portion 28, a reduced diameter stem portion 29 extending therefrom, and a terminal portion constituting a piston 30 which slides in the bore of the housing 21. The throttle portion 28 of the spool member cooperates with the inlet ports 26 and outlet ports 27 to define a variable flow passage therebetween, the throttle portion being formed at one end with longitudinally extending tapered grooves 31 which are spaced circumferentially around the surface of the throttle portion and cooperate with the wall of the casing to define said variable flow passage. The grooves 31 open into an annular discharge chamber 32 formed between the reduced diameter stem portion 29 and the casing 21, the chamber 32 communicating with the outlet ports 27.

In the valve configuration shown in FIG. 3 the valve member 25 is biassed to the fullest extent by the compression spring 24, the throttle portion in this case closing the flow passage between the inlet and outlet ports. However, in operation of the valve the spool member 25 is displaceable against the spring bias by fluid pressure applied to the operative face of the piston 30 for opening the variable flow passage by a selected amount. The operative face of the piston 30 is formed with a cavity 35 having a flow restricting orifice 33 communicating with a central bore 34 of the spool member 25, and with the discharge chamber 32 via ports 135.

Referring now also to FIG. 2, the end of the bore in the valve block 20, housing the flow control valve 17, provides an end closure for the valve housing 21, thus forming a pilot chamber 36 having a connecting port 37. In operation of the valve, the connecting port 37 is interconnected with a pulsating fluid supply, provided by the solenoid valve 18. Since the operative face of the piston 30 is exposed to the pulsating fluid in the pilot chamber 36, the spool member 25 is displaced against the bias of the compression spring 24 until the force exerted by the fluid on the face of the piston is balanced by the restoring force exerted by the spring. This restoring force is itself a function of the displacement of the spool member and in turn controls the rate at which fluid is bled through the orifice 33. Since the control fluid supply is pulsating the spool member is maintained in a state of dither about a mean position determined by the mean control pressure in the pilot chamber, the mean control pressure being determined by the rate at which fluid is supplied to the pilot chamber and the rate at which it is bled off via the orifice 33.

The valve 18 is a normally cloed, solenoid-operated poppet valve having a solenoid 38, an armature 39, and a poppet 40 which is normally loaded by a spring 41 to close a supply orifice 42. The valve has inlet ports 43 which are interconnected with the inlet ports 26 of the flow control valve by an internal duct 44, the duct 44 terminating at a port 45 inthe valve block 20 for connection to the upstream side of the fluid line 13 (FIG. 1). As previously mentioned, the solenoid is actuated by energizing current pulses from the remote electronic unit 120 to provide the pulsating fluid supply to the pilot chamber 36 via the connecting port 37.

The pressure compensator valve 19 is of a commercially available type, the valve shown in the drawings being Type PCS3-16-0-80 supplied by Modular Controls Corporation. This has an adequate capacity for the intended purpose and provides a fixed pressure differential of 80 p.s.i. between the inlet and outlet ports 26, 27 of the flow control valve regardless of changes of supply pressure or load variations.

The pressure compensator valve 19 comprises a valve casing 46 providing an inlet 47 communicating with the outlet ports of the flow control valve 17 via an internal duct 48 of the valve block 20. The casing also provides an outlet 49 communicating with a port 50 for connection to the downstream side of the fluid line 13 (FIG. 1). The casing 46 is closed at one end by a retainer cap 51 which houses a compression spring 52, the latter biasing a spool-like compensator element 53 one end of which is exposed to inlet fluid pressure tending to displace the element against its bias for regulating the downstream pressure at the port 50.

In operation of the assembly, hydraulic fluid is supplied by the pump 10 via the flow control assembly 16 to the motor 12. Pressure variations in the line 13 are compensated automatically in a known manner by the pressure compensator valve 19. However, the volumetric rate of fluid flow can be varied over a continuous range, the flow rate being determined by the valve 17 whose valve element 25 is maintained in a constant state of dither in accordance with the pulsating pressure of fluid in the pilot chamber 36, the mean position of the valve element being determined by the difference between the rate at which fluid is supplied to the chamber from the solenoid valve 18 and the rate at which fluid is bled from the chamber via the orifice 33. The regulated flow rate is varied by controlling the energization of the solenoid 38 of the solenoid valve, from the remote electronic unit 120, the latter being designed to produce energizing pulses of a predetermined pulse width whose frequency can be controlled, or pulses at a predetermined frequency whose width can be controlled, or pulses which can be controlled in both frequency and pulse width. The essential requirement is that the solenoid valve 18 should be operated so as to deliver the hydraulic fluid to the pilot chamber 36 at a controllable rate for setting the valve member 25 at a selected position, and in a pulsating manner for maintaining the valve member in a state of dither at that position.

Figure 4:
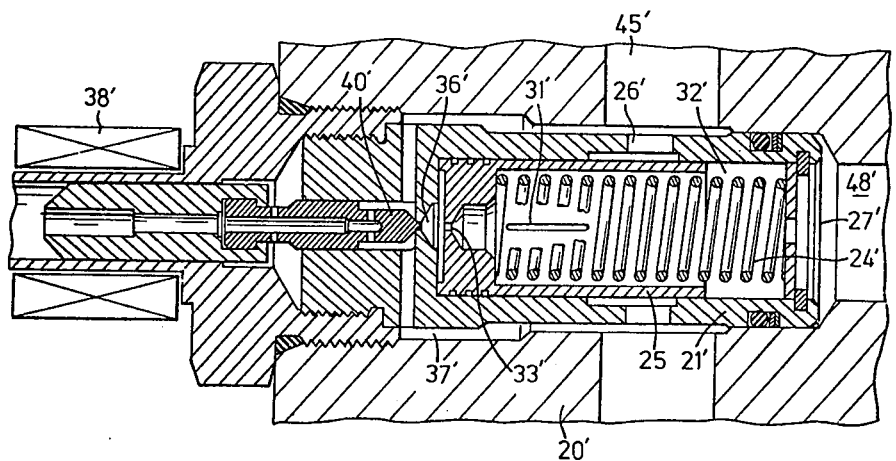
FIG. 4 is a sectional view of a modified flow control valve and solenoid valve combination.

Referring now to FIG. 4, there is shown a valve assembly in which the flow control valve and the solenoid valve are integrated in a common structure. A valve block 20' provides an internal bore in which the valve assembly is mounted as shown, an internal passage 45' communicating with the inlet ports 26' of the flow control valve, and an internal passage 48' communicating with an outlet 27' which in this construction is at one end of the flow control valve. The flow control valve comprises a cylindrical body 21' providing the inlet ports 26' and outlet 27', and slidably mounted within the valve body is a valve member 25' which is biassed towards the closed position by a compression spring 24'. The valve member 25' provides an internal space open, or discharge chamber 32', at one end and communicating with the outlet 27', and providing a bleed orifice 33', at its other end communicating with a pilot chamber 36'. The cylindrical wall of the valve member 25' is formed with elongated axially extending slots 31' by which fluid can flow from the inlet ports 26' to the outlet 27' via the valve member when the latter is displaced against its spring bias.

As in the preceding embodiment the valve member 25' is displaced against the bias of the spring 24' by fluid which is supplied to the pilot chamber 36'; in accordance with the operation of a solenoid-operated poppet valve 40', the fluid being supplied from the passage 45' via passages 37' in the valve block 20', and being bled via the orifice 33' to the discharge side of the valve. As before, the force acting on the piston-like end face of the valve member 25', and hence the mean position of the valve member, will be determined by the rate at which fluid is supplied to the pilot chamber 36', the fluid being bled away via the orifice 33' at a rate determined by the pressure drop across the orifice and hence the loading of the spring 24'. The displacement of the valve member, and hence the flow rate of the valve, is controlled by controlling the pulse frequency or pulse width of energizing current to the solenoid 38' of the valve, thereby controlling the mean flow rate of the fluid supplied to the pilot chamber 36', the valve member 25' being maintained in a state of dither about its mean position.

Figure 5:
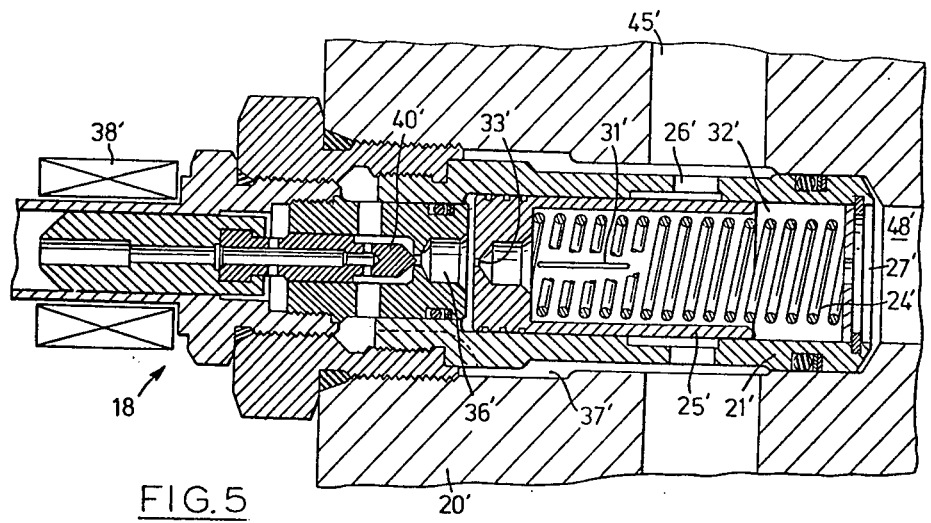
FIG. 5 is a sectional view of a further modification of the combination shown in FIG. 4.

The modification shown in FIG. 5 is essentially the same as that of FIG. 4 except that the solenoid valve 18, instead of being integrated with the flow control valve, is a separate valve identical with that shown in FIG. 2 and mounted at one end of the flow control valve in the manner shown. In other respects the arrangement is the same as that of FIG. 4 and corresponding parts are denoted by the same reference numerals.

What I claim is:

1. A flow control valve for hydraulic fluids comprising:
   a valve housing providing an inlet port for connection to a pressurized fluid supply and an outlet port for connection to a fluid line;
   a valve member slidably positioned in said housing,
   the valve member cooperating with said inlet and outlet ports to define a variable flow passage therebetween;
   means resiliently biasing the valve member towards a first position at which it closes said variable flow passage,
   the valve housing further providing a pilot chamber having a connecting port for connection to a pulsating fluid supply,
   the valve member having one face exposed to fluid pressure in said pilot chamber and being displaceable thereby against the bias of said biasing means for opening said variable flow passage; and
   bleed means communicating with said pilot chamber for bleeding fluid therefrom whereby, in operation of the valve, the valve member is maintained in a state of dither about a mean position determined by the mean fluid pressure in said pilot chamber.

2. A flow control valve according to claim 1, wherein said biasing means is a compression spring acting on the valve member for urging the valve member towards said first position.

3. A flow control valve for hydraulic fluids comprising:
   a valve housing providing a cylindrical bore with an inlet port for connection to a pressurized fluid supply and an outlet port for connection to a fluid line,
   a spool member freely slidable within said bore,
   the spool member having a throttle portion cooperating with said inlet and outlet ports to define a variable flow passage therebetween, and a reduced stem portion defining with said housing a discharge chamber communicating with said outlet port, the stem portion terminating in a piston,
   a compression spring located at one end of said bore, the compression spring engaging the spool member for biasing the spool member towards a first position at which said throttle portion closes said variable flow passage,
   means defining a pilot chamber at the other end of said bore, the pilot chamber having a connecting port for connection to a pulsating fluid supply,
   the piston being exposed to fluid pressure in said pilot chamber and being displaceable thereby to move the spool member against the bias of the compression spring for opening said variable flow passage, and
   bleed means communicating with said pilot chamber for bleeding fluid therefrom whereby, in operation of the valve, the spool member is maintained in a state of dither about a mean position determined by the fluid pressure in said pilot chamber.

4. A flow control valve according to claim 3, wherein the piston provides an internal passage communicating said pilot chamber with the discharge chamber, said internal passage including a flow restricting orifice constituting said bleed means.

5. A flow control valve according to claim 4, wherein said one end of the bore is closed by a retainer cap fitted to the valve housing, the retainer cap defining thereat an end chamber in which the compression spring is located, the spool member having a central bore communicating said end chamber with said discharge chamber.

6. A flow control valve according to claim 3, wherein the throttle portion of the spool member is formed with longitudinally extending tapered grooves cooperating with the wall of said bore to define said variable flow passage.

7. A flow control valve according to claim 3, further comprising a pressure compensator having an inlet connected to the outlet port of said valve housing and an outlet port for connection to the fluid line.

8. In combination with a flow control valve according to claim 3, a pulsating fluid supply means for supplying control fluid to said pilot chamber via said connecting port, said supply means comprising a solenoid-operated poppet valve having an inlet port for connection to said pressurized fluid supply and an outlet port connected to said connecting port of the pilot chamber.

9. The combination claimed in claim 8, further comprising a valve block providing a first bore housing said flow control valve, a second bore housing said solenoid-operated poppet valve and internal duct means interconnecting the outlet port of the poppet valve with the connecting port of the pilot chamber and the inlet port of the poppet valve with the inlet port of the flow control valve, said internal duct means terminating in ports for connection to the pressurized fluid supply and the fluid line.

10. The combination claimed in claim 9, wherein the valve block provides a third bore housing a pressure compensator having an inlet port interconnected with the outlet port of the flow control valve and an outlet port for connection to the fluid line, said internal duct means of the valve block further interconnecting the pressure compensator with the pressurized fluid supply.

11. A continuously variable pressure compensated flow control system for hydraulic fluids, comprising in combination:
(a) a flow control valve, the flow valve comprising
  (i) a valve housing providing an inlet port for connection to a pressurized fluid supply, and an outlet port,
  (ii) a valve member slidably positioned in said housing, the valve member cooperating with said inlet and outlet ports to define a variable flow passage therebetween,
  (iii) spring means biasing the valve member towards a first position at which it closes said variable flow passage,
  (iv) the valve housing further providing a pilot chamber having a connecting port, the valve member having one face exposed to fluid pressure in said pilot chamber and being displaceable thereby against the bias of said spring means for opening said variable flow passage, and
  (v) bleed means communicating with said pilot chamber for bleeding fluid therefrom;
(b) means defining a pulsating fluid supply, said means comprising a solenoid-operated poppet valve having an inlet for connection to said pressurized fluid supply and an outlet communicating with said connecting port of said pilot chamber;
(c) pressure compensating means having an inlet communicating with said outlet port of the flow control valve, an outlet for connection to a fluid line, and a control port communicating with said pressurized fluid supply; and
(d) continuously variable electronic pulsing means operatively interconnected with the solenoid of said poppet valve for actuating same, thereby to supply fluid at a controlled pulsating flow rate to the pilot chamber of said flow control valve whereby the valve member thereof is maintained in a state of dither about a mean position determined by the mean fluid pressure in said pilot chamber in accordance with the control of said electronic means.

12. A flow control valve for hydraulic fluids, comprising:
a valve housing providing a cylindrical bore with an inlet for connection to a pressurized fluid supply and an outlet for connection to a fluid line,
a valve member freely slidable in the bore,
the valve member having an end face and having a cylindrical throttle portion extending therefrom, the cylindrical throttle portion slidably engaging said bore and cooperating with said inlet and outlet to define a variable flow passage therebetween,
means resiliently biasing the valve member towards a first position at which it closes said variable flow passage,
means defining a pilot chamber at one end of said bore adjacent said end face of the valve member, the pilot chamber having a connecting port for connection to a pulsating fluid supply,
said end face of the valve member being exposed to fluid pressure in said pilot chamber and being displaceable thereby against the bias of said biasing means for opening said variable flow passage, and
bleed means communicating with said pilot chamber for bleeding fluid therefrom whereby, in operation of the valve, the valve member is maintained in a state of dither about a mean position determined by the mean fluid pressure in said pilot chamber.

13. A flow control valve according to claim 12, wherein said biasing means is a compression spring acting on the valve member for urging the valve member towards said one position.

14. A flow control valve according to claim 13, wherein said cylindrical throttle portion of the valve member defines an interior space constituting a discharge chamber communicating with said outlet, said throttle portion providing a longitudinally extending slot cooperating with said inlet thereby forming said variable flow passage.

15. A flow control valve for hydraulic fluids, comprising:
a valve housing providing a cylindrical bore with an inlet port for connection to a pressurized fluid supply and an outlet at one end of said bore for connection to a fluid line,
a valve member freely slidable within said bore,
the valve member having a cylindrical wall defining internal discharge chamber communicating with said outlet and formed with an elongated slot cooperating with said inlet port to define a variable flow passage between said inlet port and the discharge chamber,
a compression spring located at one end of the cylindrical bore, the compression spring engaging the valve member for biasing the valve member towards a first position at which it closes said variable flow passage,
means defining a pilot chamber at the other end of said bore, the pilot chamber having an inlet for connection to a pulsating fluid supply,
the valve member having an end face exposed to fluid pressure in the pilot chamber and being displaceable thereby to move the valve member against the bias of the compression spring for opening said variable flow passage, and
bleed means communicating with said pilot chamber for bleeding fluid therefrom whereby, in operation of the valve, the valve member is maintained in a state of dither about a mean position determined by the fluid pressure in said pilot chamber.

16. A flow control valve according to claim 15, wherein said end face of the valve member provides an internal passage communicating the pilot chamber with said discharge chamber, said internal passage including a flow restricting orifice constituting said bleed means.

17. In combination with a flow control valve according to claim 16, structural means defining a valve block having an internal bore and internal passages communicating with said bore, the flow control valve being mounted in said bore, and means providing a pulsating supply of fluid comprising a solenoid-operated poppet valve mounted at one end of the bore in operative relation to the flow control valve, the poppet valve having an inlet communicating with said pressurized fluid supply via said internal passage means and an outlet communicating directly with said inlet of said pilot chamber, whereby, in operation of the valve, the valve member is maintained in a state of dither about said mean position.

* * * * *